United States Patent Office 3,809,605
Patented May 7, 1974

3,809,605
FIBROUS MATS AND SHEETS CONTAINING IMMOBILIZED ENZYMES ENTRAPPED IN THEIR INTERSTICES
Edward Emil Schmitt, Norwalk, Conn., Rocco Albert Polistina, Port Chester, N.Y., and Peter Salvatore Forgione, Stamford, Conn., assignors to American Cyanamid Company, Stamford, Conn.
No Drawing. Filed Oct. 30, 1972, Ser. No. 302,370
Int. Cl. D21d 3/00
U.S. Cl. 162—158
10 Claims

ABSTRACT OF THE DISCLOSURE

A liquid laid web comprising cellulosic or other fiber forming material having a carrier bound enzyme dispersed throughout the interstices thereof in an amount of 5–50% by weight.

Background of the invention

The binding of enzymes to suitable carriers in order to immobilize the enzymes and thereby render them more easily utilizable in the conversion of enzymatically convertible substrates has become increasingly important in recent years. Many methods of achieving the immobilization of the enzymes have been discussed, including adsorption, covalent binding, lattice inclusion, and covalent cross-linking.

In copending application Ser. No. 234,299, filed Mar. 13, 1972, and hereby incorporated herein by reference, there is disclosed a unique class of polymer bound immobilized enzymes and a method for their production. However, said bound enzymes and many of those available commercially, although of high activity, tend to be difficult to handle as such and, as a result, are not useful in their immobilized condition per se for many industrial applications, including the normal conversion of substrates to their conversion products.

Summary of the invention

We have now found that the catalytic activity of immobilized enzymes can be maintained and the handling of the immobilized enzyme can be made more facile by physically entrapping or dispersing the immobilized enzyme throughout the interstices of fibrous webs i.e. sheets or mats, of cellulosic or other fiber-forming materials.

Enzymes per se have been covalently attached to fibers, but the levels of resultant enzyme activity have been very low. Similarly, papers and glass mats have been saturated with enzyme solutions and then dried to afford an enzymatically active paper, however, the enzyme unfortunately migrates and is even removed when it is rewetted by an aqueous solution of the substrate.

Accordingly to our invention, there is provided a reaction arena within which a given substrate can be acted upon by a fixed and constant quantity of enzyme. Enzymatic reactions can take place within the vehicle whereby substrate solutions may be added to these systems without loss or movement of enzyme. A wide variety of enzyme activities can be achieved merely by adjusting the ratio of the cellulosic or other fibers to immobilized enzyme with exact reproduction being the rule rather than the exception.

Substrate solutions capable of undergoing enzymatic transformations may be passed through the novel webs i.e. sheets and/or mats, of the present invention wherein a chemical reaction occurs and the pure converted substrate emerges from the device containing the web. On a smaller scale, chemical reactions can be conducted uniformly within our novel webs, since the enzyme concentration is always constant and is not affected by evaporation, concentration gradients, hydrodynamics etc.

By "immobilized enzyme" or "carrier-bound enzyme," as used herein, is meant the product produced by binding an enzyme to a carrier by any of the four mechanisms mentioned above.

Description of the invention including preferred embodiments

The compositions which are dispersed throughout the interstices of the webs according to our invention comprise a water-insoluble carrier having a catalytically active enzyme bound thereto. Any carrier having these properties may be utilized herein and the enzyme may be bound thereto in any known manner, i.e. those mentioned above.

The carriers for the enzymes may be polymeric or non-polymeric and still find use in the present invention. Polymers which may be used as carriers for the enzymes, include such materials as aminoethylated cellulose, diazobenzyl cellulose, diaztoized p-aminobenzyl cellulose, amino - s - triazine cellulose, acid chlorides of carboxylic or sulfonic acid ion-exchange resins, carboxy methyl cellulose azide, bromoacetyl cellulose, methacrylic acid-methacrylic acid-3-fluoro-4,6 - dinitroanilide copolymers, the diazotized - m - aminobenzyloxymethyl ether of cellulose, diazotized poly-p-aminostyrene, the diazotized copolymer of p-aminophenylalanine and leucine, phosgenized poly-p-aminostyrene, ethylene-maleic anhydride copolymers, polyisothiocyanate derivatives of poly-p-aminostyrene, polystyrylmercuric acetate, acrylamide-methylene-bisacrylamide copolymer gels, polyacrylamide, poly-4-hydroxy-3-nitrostyrene and the like.

Examples of carbonyl polymeric carriers which are preferred for use herein include those produced according to any known procedure from such aldehyde monomers as acrolein; α-alkyl acroleins, e.g. methacrolein, α-propyl-acrylein; crotonaldehyde; 2-methyl - 2 - butenal; 2,3-dimethyl-2-butenal; 2-ethyl-2-hexenal; 2 - decenal; 2 - dodecenal; 2-methyl-2-pentenal; 2-tetradecenal and the like, alone or in admixture with up to 95%, by weight, based on the total weight of the copolymer, of each other and/or other copolymerizable monomers known to react therewith such as unsaturated alcohol esters, e.g. the allyl, crotyl, vinyl, butenyl etc. esters of saturated and unsaturated aliphatic and aromatic monobasic and polybasic acids such as acetic, propionic, butyric, valeric, adipic, maleic, fumaric, benzoic, phthalic, terephthalic, etc. acids; vinyl cyclic compounds (including monovinyl aromatic hydrocarbons) e.g. styrenes, o-, m-, and p-chlorostyrenes, -bromostyrenes, -fluorostyrenes, -methylstyrenes, -ethyl-styrenes; various poly-substituted styrenes, e.g., di-, tri-, and tetra-chlorostyrenes, -bromostyrenes, etc.; vinyl naphthalene, vinyl chloride, divinyl benzene, allyl benzene, vinyl pyridine, diallyl benzene; various α-substituted and α-substituted, ring-substituted styrenes, e.g. α-methyl styrene, α-methyl-p-methyl styrene, etc.; unsaturated ethers, e.g. ethylvinylether, etc.; unsaturated amides e.g. acrylamide, methacrylamide etc.; N-substituted acrylamides e.g. N-methylolacrylamide, N-allyl acrylamide, N-methyl acrylamide, etc.; acrylates such as the methyl, ethyl, propyl, butyl, etc. acrylates and methacrylates; nitriles such as acrylonitrile and other comonomers shown, for example, in U.S. Pat. No. 2,657,192 mentioned hereinabove.

Examples of other preferred carbonyl polymers which may be utilized as carriers herein include those produced according to any known procedure and in amounts similar to those indicated above in regard to the aldehyde polymers from such ketone monomers as methyl vinyl ketone, methyl allyl ketone, ethyl vinyl ketone, methyl isopropenyl ketone, ethyl allyl ketone, etc. phenyl vinyl ketone, p-tolylvinyl ketone. Also, we may use such polymers as poly(vinylpyridinium ketones) and haloketones; copolymers of the above-mentioned aldehyde monomers and ketone monomers with or without the above-disclosed copolymerizable comonomers; polyacetyl and the like. The molecular weights of the polymers used is not critical and those as low as 1000 can be used.

Similarly, such polymers as the copolymers of ethylene and carbon monoxide and various glyoxal adducts, all well known in the art, can be utilized herein as carriers.

Examples of other carriers which may be used in the present invention include porous glass, asbestos, charcoal and the like. The above carrier listing is in no way to be considered as all-inclusive and any other carriers may also be used herein.

The polymeric carriers are prepared depending, of course, upon the specific material being used, by rendering the material susceptible to reaction with the enzyme and should be hydrophilic in character. In the case of most carbonyl polymers, for example, the polymer is first made water-soluble by reaction with a suitable solubilizing agent such as a sulfite, a hydrosulfite, a bisulfite, sulfurous acid etc. Specifically, alkali metal or alkaline earth metal sulfites, hydrosulfites or bisulfites such as sodium, potassium, calcium, ammonium etc. bisulfites, sulfites and hydrosulfites including aqueous sulfurous acid per se or as formed by $SO_2$ in water, may be used. The reaction is conducted at a temperature ranging from about 25° C. to about 90° C., at atmospheric pressure, although superatmospheric or subatmospheric pressure can be utilized, if desired, the process being more specifically disclosed in U.S. Pat. No. 2,657,192, hereby incorporated herein by reference. After the sulfite treatment, the carbonyl polymer is then made hydrophilic, such as by cross-linking. By the term "hydrophilic," as used herein, is meant that the carrier is swellable in or capable of taking up water but is not substantially soluble therein. The materials can contain hydrophobic members or portions provided that they also have hydrophilic portions which function as such when in contact with water. Any cross-linking agent or water-insolubilizing agent can be used for this purpose with such materials as bis-diazobenzidine, bis-diazohexane, N,N'-1,2-phenylene-bis(maleimide), phenol-2,4-disulfonyl chloride, m-xylylene diisocyanate, epichlorohydrin, p-nitrophenyl chloroacetate, tris[1-(2-methyl)aziridinyl]phosphine oxide, diamines such as 1,6-hexamethylene diamine, dialdehydes such as glutaraldehyde and the like being exemplary. The general conditions taught in U.S. Pat. No. 3,459,710, also hereby incorporated herein by reference, can be followed. For example, the sulfited carbonyl polymer adduct or reaction product may be contacted with a diamine such as ethylene diamine, tetramethylene diamine, 1,6-hexane diamine, etc. at a temperature of about 0–150° C. and in the presence of a solvent. If desired, the cross-linking step may be accomplished first and the sulfite reaction second, the only criteria being that the resultant product is in such a state so as to allow reaction thereof with the enzyme.

Insolubilizing the carriers can also be accomplished in a multiplicity of other ways such as by reaction thereof with a polyunsaturated cross-linking agent such as divinyl benzene etc. or any other polyfuntional compound which will cause the formation of a network of polymeric structures via reaction with the carrier through available cross-linking sites. Grafting of the polymer carriers by irradiation thereof with X-rays or γ-rays etc. can also be accomplished to render them hydrophilic. Additionally, the insolubilizing can be effected by reacting the carrier material with such agents as 4-aminophenyl sulfide hydrochloride salt etc.

In regard to other polymeric carriers, the same procedure specified above in regard to the carbonyl polymers may be utilized if the carriers per se are not sufficiently hydrophilic to enable them to be bound to the enzyme. That is to say, some polymeric materials are not per se water-soluble and since most enzymes are denatured by organic solvents and therefore any reaction therewith must be carried out in an aqueous medium, the polymeric carriers must be rendered hydrophilic before contact with the enzyme. Reactions of this general type are shown in U.S. Pat. No. 3,271,334, also hereby incorporated herein by reference.

When the carrier polymer is per se water-soluble, the sulfite reaction need not be conducted and the enzyme can be bound to the carrier immediately after rendering it, the carrier, insoluble, such as by cross-linking, as discussed above. Water-solubilizing and cross-linking need not be accomplished, of course, if the carrier is per se hydrophilic. The basic requirement is that the polymeric carrier having the enzyme bound thereto must be hydrophilic in order that it may be utilized in the enzymatic conversion of substrates to their conversion products.

In a specific embodiment of the preparation of a sulfited carbonyl polymer bound enzyme product, polyacrolein a water-insoluble polymer which contains groups with which most enzymes are reactive, is first contacted with a sulfite such as sodium bisulfite in order to render it water-soluble. In such a condition, however, the polymer cannot be reacted with an enzyme because recovery of any product thereof is relatively impossible due to its water-solubility and the damaging effect of heat and solvents on enzymes. Cross-linking of the bisulfite-polymer product, however, renders it gel-like in consistency and effectively hydrophilic so as to allow reaction with the enzyme. As a result, the bisulfite-polyacrolein product is preferably cross-linked with a diamine such as 1,6-hexamethylene diamine. The result of these two reactions is believed to be that the bisulfite breaks some of the heterocyclic rings of the poly-acrolein creating more enzyme-reactive aldehyde groups thereon, in addition to a series of bisulfite groups. The diamine reacts with some of these aldehyde groups with the formation of —CH=N— linkages between two polymer molecules, thereby cross-linking the polyacrolein. Reaction of the enzyme forms an adduct or covalent bond between the enzyme and the other available aldehyde groups, and also may result in some reaction through the bisulfite groups. The resultant adduct is then comprised of a series of cross-linked groups, free aldehyde groups, heterocyclic bisulfite reaction groups and bound enzyme groups. By the term "sulfited," as used herein, is meant that the carbonyl polymer has been contacted with a sulfite so as to modify it and should not be construed to necessarily mean that any added sulfite groups per se remain on the polymer after enzyme binding, although such may be the case.

Of course, when non-polymeric carriers are employed, the ultimate system, having the enzyme attached thereto in any manner such as those described above, may also be used herein and need not be hydrophilic. Therefore such carriers as glass, asbestos, charcoal etc. need not be first rendered hydrophilic before use in the production of our novel products.

The enzyme is bound to the carrier at a temperature below that at which it, the enzyme, is deactivated. Generally, temperatures below about 75° C., preferably from about 5–65° C., should be used. Therefore, if the webs of the instant invention must be subjected to temperatures higher than about 75° C. during their formation, the carrier alone is first incorporated into the interstices of the sheet or mat and the enzyme is then subsequently bound to the carrier. If, however, the web is to be prepared at temperatures below about 75° C., the enzyme may be bound to the carrier first and then the immobilized enzyme system can be incorporated into the web during its production.

The binding of the enzyme to the carrier is preferably conducted in the presence of buffers (pH 6.0–8.0) and with agitation. The binding is accomplished in the presence of water since most solvents tend to deactivate the enzyme, as mentioned above.

The immobilized (bound) enzyme is dispersed throughout the interstices of the web of cellulosic or other fiber-forming material in amounts ranging from about 5% to about 50%, by weight, based on the weight of the web, the resultant web then having from about 0.1 to about 100.0 units, preferably 0.3–90.0 units, of activity thereon per ½ inch section of web of a thickness of from about 3 mils to about 30 mils.

The term "water-laid" is used herein to describe a method by which fibrous webs are formed, whether the vehicle is water or other suitable liquid.

Any fiber-forming material may be used to form the web portion of the novel articles of the present invention. If cellulosic fibers are used, all types of fiber stocks, including those of poor quality, such as oak, poplar, yellow birch and those of extremely short fiber length, as well as those of long fiber length and of good quality derivation, such as spruce and hemlock are contemplated. A wide variety of fibrous cellulosic material used in the preparation of paper, board, molded resin fillers and the like may also be used such as kraft pulp, rag pulp, ground wood, sulfite pulp, alpha pulp and the like. Similarly, other forms of web-forming fibrous cellulose such as cotton linters, linen and the like may be employed. These materials may be used alone or in admixture with fibers from other sources such as jute, hemp, sisal, strings, chopped canvas and other materials, either cellulosic or non-cellulosic.

It is further stressed that the cellulosic webs may also be obtained from bleached or unbleached kraft, bleached or unbleached sulfite or bleached or unbleached semi-chemical pulps. In addition, the webs may be made from mixtures of cellulosic paper-forming pulps with up to 10% of such other fibers and the like.

For most purposes it is preferred that the starting cellulosic fibers be unsized and generally free of added resins. However, for some purposes, it may be desirable to employ as the web, a porous, high wet strength paper such as may be obtained by incorporating into the web from about 0.5 to 5.0%, by weight, based on the weight of the fibers, of a thermosetting aminoplast resin such as a urea-formaldehyde resin, a melamine-formaldehyde resin and the like. Such wet strength cellulosic webs are obtained in the conventional way by the use of such a resin applied to the pulp suspensions followed by sheeting and baking at temperatures of 210° to 400° F. for periods of about 5 minutes to 1 hour.

The method of making the water-laid webs used in our invention is not critical and any known paper-making process may be employed, see, for instance, U.S. Pat. No. 3,551,205, hereby incorporated herein by reference. In the normal manufacture of paper, for example, cellulosic fibers such as those derived from wood pulp are beaten in water to disperse the fibers therein and to reduce them to a length and fineness suitable for paper making. During the beating operation, the cellulosic fibers fibrillate to produce minute tendrils which serve to interlock the fibers together when they are deposited on the forming screen of the paper making machine from a slurry thereof to make a web therefrom as the suspending liquid is drawn through the screen.

The carrier bound enzyme may be added to the web anytime during the production thereof as long as the temperatures employed do not deactivate the enzyme, as mentioned above. Therefore, it is within the scope of the present invention to prepare a beater pulp of paper making fibers of any convenient consistency. To this can be added the bound enzyme. The suspension is then agitated gently to distribute the material uniformly therethrough and the aqueous suspension is then sheeted, preferably at a pH of between 4.5 and 6.0, to form a wet, water-laid web containing the bound enzyme. The web is then dried, preferably in air or under vacuum. Vacuum drying with a desiccant of calcium chloride for 6 days has also proven effective. Drying at elevated temperatures is to be avoided since high temperatures tend to deactivate the enzyme and render the dispersed material useless. In general, it is preferred that less than about 0.1% of residual water be retained in the final sheet.

By incorporating the bound enzyme within the web as it is being formed, there is obtained by direct engagement of fibers and bound enzyme, an integral mechanical union between the bound enzyme and the web. Excellent porosity and permeability of the web permit circulation of the substrate to be treated by the bound enzyme through the structure. Within the web, the fiber components enmesh to form an integral sheet structure which provides a holding and reinforcing matrix for the bound enzyme dispersed through the web.

In paper-making mills where various pigments are added at the beater, the bound enzyme may be added therewith or at any point more than about one minute before the wire. In mills where the pulp suspension is given heavy refining, the bound enzyme may be added to the beater, to the refiner effluent or to the screen effluent sufficiently ahead of the wire so that deposition becomes substantially complete before sheeting. Thus the application of the bound enzyme may be easily adapted to most types of paper or mill conditions and may be added prior to web making or, less advantageously, may be applied to the sheet at a convenient point after web making, as discussed below.

Any synthetic fiber-forming material of sheet or mat making length e.g. tow, may also be utilized according to our invention in the production of our novel articles of manufacture. In this regard, filaments of such polymeric materials as polymers of propylene including polypropylene and copolymers of propylene with copolymerizable monomers such as styrene, ethyl acrylate, vinyl acetate etc.; polyester, e.g. ethylene glycol terephthalate filaments; nylon or rayon filament; cellulose acetate filament; regenerated cellulose filament; vinyl chloride-vinyl acetate copolymer filament; polyacrylonitrile filament; copolymers of acrylonitrile with with unsaturated amides or esters such as those disclosed in U.S. Pat. No. 2,810,646 and the like may also be used herein, said patent hereby being incorporated herein by reference. Inorganic fibers such as asbestos fibers, glass fibers and the like may also be used.

Fibers which are very slightly soluble in the slurry medium may also be used. For example, when the web is cast from a water slurry, the fibers may include some proportion of slightly soluble polyvinyl alcohol fibers. In the web, as the medium is removed, these fibers tend to adhere at fiber junctions thereby providing additional strength to the ultimate article. To provide additional porosity in the web, one may employ a second fiber which is insoluble in the slurry medium but which is selectively soluble in another medium with which the web may be subsequently washed to remove the soluble fibers thereby leaving additional void space.

When filaments of fiber-forming materials of the above-mentioned type are used, the webs prepared therefrom can also be formed in any manner known to those skilled in the art. One method found particularly satisfactory is to mix a concentrated slurry of the fibers with the carrier and spread the resultant mixture on a flat plate which is heated to a temperature of between about 50° C. and 150° C. while pressing another plate thereon. Water-soluble salts such as sodium chloride may also be incorporated into the system. These salts can then be washed out of the web later thereby increasing the porosity of the web. Utilizing this technique, the carrier is preferably first blended with the filaments and the enzyme is bound thereto after the sheet or mat is formed. Filaments, fibers etc. of this type can also be formed into webs by the paper-making method discussed hereinabove. In instances where the resultant sheet is very weak and difficult to remove from the wire without tearing or breaking, a first sheet of regular cellulosic paper-making fibers can be drawn down thereon and the bound enzyme sheet can then be formed on top of the cellulosic sheet.

Additionally, the bound enzyme may be incorporated into a sandwich of preformed webs by first forming the web on a screen and then contacting the wet web with bound enzyme, preferably for a period of time sufficient to enable substantially complete dispersement of the bound enzyme into the web fibers. A second web can then be formed atop the bound enzyme bearing web and the entire structure can then be dried, as described above.

By employing the water-laying method, a cohesive web is obtained in most cases without need for any further binding material of the non-fibrous type. If a binder is found necessary, however, colloidal polytetrafluoroethylene aqueous emulsion may be added to the fibers and bound enzyme before the web is cast. Agitation of the slurry causes the colloidal suspension to be broken and the PTFE to be coagulated in the slurry. When the resultant slurry is cast, the PTFE extends throughout the web binding the bound enzyme with the fibers. Other polymeric materials can also be used for this purpose, as discussed briefly above.

Once the webs of the instant invention have reduced to dry sheets or mats etc. and recovered, they may be utilized as such or they may be formed into discs or other shaped articles or otherwise treated to produce the desired object.

Exemplary of the enzymes which may be utilized herein include proteolytic enzymes, hydrolases, amylases, dehydrogenases, kinases, oxidases, deaminases, amidases, etc. including lactic dehydrogenase, creatine, phosphokinase, trypsin, papain, alk. phosphatase, amyloglucosidase, dextranase, glucose oxidase, glucose isomerase, amidase, penicillin amidase, chymotrypsin, β-galactosidase, pyruvate kinase, ficin, pepsin, carboxypentidase, streptokinase, plasminogen, urease, invertase, alcohol dehydrogenase, diastase, β-glycosidase, maltase, aldolase, lactase, amygdalase, lipase, steapsin, erepsin, zymase, catalase, melibiase, pectolase, protease, tyrosinase, L-asparaginase, cytase, adenase, guanidase, carboxylase, inulase, vinegar oxidase, aldehydase, rhamnase, myrosinase, phytase, tannase, carbamase, nuclease, guanase, adenase, thrombase, chymase, cozymase and the like.

By the terms, "catalytically active" or "active catalytic activity," as utilized herein, is meant the ability or availability of the bound enzyme to convert a particular substrate to its usual conversion product.

Incorporation of various preservatives such as antimicrobials, antioxidants, antibiotics etc., into the bound enzymes for the prevention of bacteria formation, fungal growth etc., as is known in the art, may also be effected in concentrations of less than about 1.0%, by weight, based on the total weight of the bound enzyme. Examples of suitable additives include benzoic acid and its sodium and potassium salts; alkyl esters of p-hydroxybenzoic acid; propionates such as sodium propionate; sodium bisulfite; sodium metabisulfites; sodium diacetate; o-phenyl-phenol; butylated hydroxyanisole; lecithin; citrates such as monoglyceride citrate, stearyl citrate etc.; oxytetracycline chlortetracycline; benzyl alcohol; calcium sorbate; sorbic acid, mixtures thereof and the like.

EXAMPLE A

Solubilization of polyacrolein

To a suitable reaction vessel fitted with stirrer, condenser, thermometer, nitrogen gas inlet and constant-temperature bath are added 344 parts of sodium metabisulfite and 2400 ml. of distilled water. The pH of this solution is adjusted to 5.6 with 10 M sodium hydroxide solution and 300 parts of finely divided polyacrolein are added. The reaction is allowed to continue under a nitrogen blanket at 65° C. until a clear, viscous, water-soluble polyacrolein adduct forms. The reaction media is cooled and stored.

EXAMPLE B

Cross-linking of soluble polyacrolein

To a suitable glass-lined reaction vessel equipped with stirrer and nitrogen gas inlet are added 2500 ml. of the polyacrolein/bisulfite adduct produced in Example A, above, in 4000 ml. of distilled water. The solution is gently stirred and 300 parts of 1,6-hexamethylenediamine in 400 ml. of distilled water are added drop-wise over a 4 hour period. A yellow, cross-linked polymer becomes suspended and is heated to 60° C. under a heavy nitrogen blanket for 10 minutes and then cooled to room temperature. The polymer is filtered through cheese cloth, placed in a Büchner funnel and washed thoroughly with water. The cross-linked polymer is then slurried gently with 10 times its volume of water for 15–20 minutes, allowed to stand 20 minutes and is filtered. The washing procedure is repeated until the pH of the washings are between 6.5 and 7.0. The solid adduct is then slurried gently for 20 minutes with 1 M disodium phosphate adjusted to pH 6.5 and washed with distilled water.

EXAMPLE C

Binding of enzyme to cross-linked polyacrolein

To a suitable reaction vessel is added 0.625 part of invertase and 50 ml. of phosphate buffer (0.02 M; pH 7.4). The solution is allowed to stand in the refrigerator without agitation for 30 minutes. The enzyme is then completely dissolved by stirring. In a separate vessel are slurried 25 parts of the cross-linked polyacrolein of Example B, above (14 mg./g. binding capacity) with 50 ml. of the same phosphate buffer. After stirring 10 minutes, the pH is readjusted to 7.4 with 0.1 N sodium hydroxide. The contents of both vessels are then admixed and allowed to stir gently overnight at 15° C. The enzyme adduct is then filtered and washed with copious amounts of deionized water. Consistent binding yields of 75–97% are achieved.

The following examples are set forth for purposes of illustration only and are not to be construed as limitations on the present invention except as set forth in the appended claims. All parts and percentages are by weight unless otherwise specified.

EXAMPLE 1

A 50/50 Albacel/Astracel pulp (concentration 2.6 g./100 cc.) is washed with water and subsequently with methanol to remove any residual sulfite and dried. To 1.3 parts of pulp are added 5.0 parts of the wet bound enzyme adduct (100 units/g.) of Example C, above, in a suitable blending vessel. The ingredients are blended for 5 minutes, ice being added to the mixture to prevent heat build-up. The blended slurry is then processed into a paper mat about the thickness of standard filter paper and of six inch diameter on a British Hand Sheet Mold. The paper is then dried in vacuo over a desiccant for 16 hours. The resultant dry sheet yields 236 ½" discs with approximately 0.6 unit of activity each.

Treatment of the enzyme disc with 50 microliters of 100 mg. percent sucrose solution yields an equimolecular mixture of glucose and fructose after 5 minutes of contact time. This is determined by extraction of the converted substrate with water followed by chemical analysis using 3,5-dinitrosalicylic acid.

EXAMPLE 2

The procedure of Example 1 is again followed except that the enzyme bound as described in Example C is glucose oxidase. The resultant sheet is wetted with a oxygenated, aqueous glucose solution thereby yielding hydrogen peroxide in good quantity.

EXAMPLE 3

The procedure of Example 1 is again followed except that the enzyme bound as described in Example C is glucoamylase. The recovered sheet is then contacted with a 10% solution of soluble starch to produce an excellent yield of glucose.

EXAMPLE 4

10 parts of poly(methylvinyl ketone) are treated with 80 parts of water containing 8 parts of sodium bisulfite at pH 5.8 at 65° C. for 18 hours over a nitrogen atmosphere. The resulting bisulfite adduct is then treated with 1.6 parts of ethylene diamine dissolved in 16 parts of water, with stirring, for 25 minutes at 65° C. The hydrophilic polymer is then washed to neutral pH and filtered. The wet cake is dried and dispersed into cellulose fibers as set forth in Example 1. After contracting with invertase (k.=.6) at 18° C. for 16 hours, the cellulose sheet containing the bound enzyme polymer adduct is used to treat sucrose solution as in Example 1. The results are determined to be excellent with respect to the quantity of yield per quantity of charge.

Following the procedures of either Example 1 or Example 4, except that various copolymers of other homopolymers are substituted for the polymers utilized therein, bound invertase compositions are prepared, dispersed throughout the interstices of a cellulose sheet, formed into appropriate shapes and used to convert sucrose to invert sugar. In each instance, the sheets catalyzed the conversion to glucose and fructose.

The results are set forth in Table I, below.

TABLE I

| Ex.: | Carrier |
|---|---|
| 5 | Acrolein-β-allyloxyethanol (80/20). |
| 6 | Acrolein-methylvinyl ketone (45/55 (M.W. 1400). |
| 7 | Poly(vinylethyl ketone). |
| 8 | Poly(isopropenylmethyl ketone). |
| 9 | Acrolein-ethyl acrylate-styrene (25/20/55). |
| 10 | Methylvinyl ketone-vinyl acetate (5/95). |
| 11 | α - Methyl acrolein - methyl methacrylate (50/50). |
| 12 | Acrolein-vinyl acetate (60/40). |

EXAMPLE 13

10 parts of wet (~10% solids) cross-linked polyacrolein-sodium bisulfite addition complex dispersed in kraft pulp (prepared as in Example 1) are suspended in 40 parts of water at pH 3.5 and reacted with 0.110 part of crystalline trypsin, dissolved in 4 parts of water. The reaction mixture is stirred for 18 hours at 10° C. and at the end of this time the resulting covalently bound trypsin adduct slurry is washed until free of unbound enzyme. Analysis of the washings at 280 mμ indicates that 72.8% of the enzyme is bound to the polymer. The slurry is then formed into a sheet which when packed in a column utilizing benzoyl arginine ethyl ester (BAEE) substrate, is shown to be effective catalytically after 18 days of continual use.

EXAMPLE 14

2.5 parts of poly(isopropenylmethyl ketone) are stirred with 25 parts of water containing 2.1 parts of potassium metabisulfite at pH 5.8 for 16 hours at 75° C. over a nitrogen atmosphere. At the end of this time, 1.3 parts of 2-(2 - aminoethyl)-5(6)-aminoethylbicyclo-2.2.1 heptane in 5 parts of water are added to the above reaction mixture and stirred at 80° C. for 25 minutes. The hydrophilic adduct which results is washed to neutral pH and filtered. The wet cake is dispersed throughout the fibers of kraft pulp as in Example 13 and then suspended in 30 parts of water and reacted with .025 part of glucose oxidase dissolved in 2 parts of water at 10° C. for 18 hours. The resultant covalently bound enzyme slurry is washed free of unbound glucose oxidase with cold distilled water, filtered, and formed into a sheet. The results are similar to those shown in Example 1.

EXAMPLES 15-19

Following the techniques of the previous examples, various other enzymes are bound to polymeric materials, added to cellulose fibers and formed into sheets to produce hydrophilic compositions. In each instance, the activity of the enzymes in sheet form was excellent as indicated by the high conversion (>90%) of product obtained upon contact with its corresponding substrate. The results of these runs are set forth in Table II, below.

TABLE II

| Example | Enzyme bound as in Ex. No. | Enzyme |
|---|---|---|
| 15 | 4 | Catalase. |
| 16 | 13 | Rennin. |
| 17 | 10 | L-asparaginase. |
| 18 | 12 | Tyrosinase. |
| 19 | 1 | Lipase. |

EXAMPLES 20-24

The procedure of Example 1 is again followed except that the polyacrolein is solubilized with (20) sodium sulfite, (21) sodium hydrosulfite, (22) sulfurous acid, (23) calcium sulfite and (24) ammonium bisulfite. In each instance, an excellent product is obtained.

EXAMPLES 25-27

The procedure of Example 1 is again followed except the polyacrolein used is cross-linked with (25) methylene bisacrylamide, (26) isophorone diamine and (27) 4-aminophenyl sulfide hydrochloride salt. Again high conversions of substrate were observed when contacted with the cellulosic enzyme sheet.

EXAMPLE 28

A commercially available polymer bound enzyme comprising chymotrypsin on carboxymethyl cellulose is dispersed in cellulose fibers, sheeted as in Example 1 and suspended in a 1.0% aqueous casein solution at 5° C. Excellent results are achieved.

EXAMPLES 29-40

Other water-insoluble carrier bound enzymes are dispersed throughout paper-making fibers, as in Example 1, sheeted and, as specified below, utilized in the conversion of substrates to their normal conversion products. In each instance, the conversions of substrate to product were found to be high (60 to 100%) depending on the reaction conditions of time, temperature and pH used. The carrier bound enzymes utilized are:

(29) trypsin bound to bromoacetyl cellulose and used to treat a 1.0% aqueous casein solution.

(30) glucose isomerase adsorbed on asbestos and contacted with a 5.0% aqueous glucose solution.

(31) L-asparaginase adsorbed in the pores of finely divided porous glass and treated with a 2.0% aqueous L-asparagine solution.

(32) papain covalently coupled to the water-insoluble diazonium salt of a p-amino-DL-phenylalanine-L-leucine copolymer and used to treat a 1.0% aqueous hemoglobin solution.

modified with various bound enzymes, which mats are then used as set forth therein. In each instance, excellent enzyme activity of the ultimate article is observed. The results are set forth below in Table III.

TABLE III

| Example | Polymer filament | Enzyme | Carrier | Use |
|---|---|---|---|---|
| 2 | Cellulose acetate | Trypsin | Aminoethylated cellulose | Treat BAEE substrate. |
| 43 | Vinyl chloride-vinyl acetate (70/30) | Glucose isomerase | Acid chloride of acid ion-exchange resin | Treat glucose solution. |
| 44 | Regenerated cellulose | Lipase | Polyvinyl ketone | Triglycerides to fatty acids. |
| 45 | Polyacrylonitrile | Invertase | Polyacrolein | Treat sucrose. |
| 46 | Ethylene glycol terephthalate | Glucose oxidase | Acrolein-styrene (95/5) | Treat glucose solution. |
| 47 | Polyamide | Pepsin | Asbestos | Hydrolyze protein at acid pH. |
| 48 | Acrylonitrile-amide copolymer (95/5) | Lactase | Porous glass | Treat lactose solution. |
| 49 | Acrylonitrile-ester copolymer (90/10) | Catalase | Charcoal | Decomposes hydrogen peroxide |

(33) ficin bound to carboxymethyl cellulose and treated with a 1.0% aqueous casein solution.

(34) pepsin bound to poly-p-aminostyrene and contacted with a 1.5% aqueous casein solution.

(35) papain bound to collagen cross-linked with benzidine and used to treat a 1.0% aqueous gelation solution.

(36) trypsin adsorbed on charcoal, bound with PTFE, and used to treat a 1.5% aqueous hemoglobin solution.

(37) chymotrypsin bound to p-amino-DL-phenylalanine-L-leucine copolymer and used to contact a 1.0% aqueous casein solution.

(38) chymotrypsin bound to p-aminobenzyl cellulose and contacted with a 1.0% aqueous casein solution.

(39) glucose isomerase bound to carboxymethyl cellulose azide and treated with a 15% aqueous starch solution.

(40) invertase bound to methacrylic acid-methacrylic acid-3-fluoro-4,6-dinitroanilide copolymer and treated with a 10% aqueous sucrose solution.

EXAMPLE 41

To a suitable reaction vessel are added 100 parts of the modified polyacrolein of Example B, above, along with 200 parts of tow fibers of a copolymer of propylene and styrene (90/10). The resultant mixture is placed between two flat metal plates (6" x 6") together with 40 parts of sodium chloride crystals which are pressed together under hand pressure and heated at 123° C. for two minutes. The sodium chloride is then extracted from the resultant mat and invertase is bound to the acrolein carrier by immersing the mat in a solution of invertase in phosphate buffer (0.02 M; pH 7.4) for 16 hours at 25° C. The mat is then washed with deionized water. Upon contact with 100 ml. of 10% sucrose solution at 55° C. and pH 5.0, conversion to 90% invert sugar is recorded.

EXAMPLES 42–49

Again following the procedure of Example 41, various synthetic polymeric materials are pressed into mats and

We claim:

1. An article of manufacture comprising a liquid laid web of a cellulosic or other fiber-forming material having a carrier bound enzyme dispersed throughout the interstices thereof in an amount of 5–50% by weight.

2. An article according to claim 1 wherein said carrier is a carbonyl polymer.

3. An article according to claim 1 wherein said carrier is an aldehyde polymer.

4. An article according to claim 1 wherein said carrier is a ketone polymer.

5. An article according to claim 1 wherein said carrier is an acrolein polymer.

6. An article according to claim 1 wherein said carrier is polyacrolein.

7. An article according to claim 1 wherein said carrier is sulfited polyacrolein.

8. An article according to claim 1 wherein said carrier is sulfited polyacrolein cross-linked with a diamine.

9. An article according to claim 1 wherein said web is produced from a cellulosic material.

10. An article according to claim 1 wherein said web is produced from a copolymer of propylene and styrene.

References Cited
UNITED STATES PATENTS 2,765,233  10/1956  Sarrett et al. ____ 195—DIG 011
3,753,861  8/1973   Forgione et al. _____ 195—68
3,730,841  5/1973   Forgione et al. _____ 195—63

S. LEON BASHORE, Primary Examiner

P. CHIN, Assistant Examiner

U.S. Cl. X.R.

162—157; 195—63, 68